(12) United States Patent
Nahar

(10) Patent No.: US 6,481,626 B1
(45) Date of Patent: Nov. 19, 2002

(54) FLUSH SCANNER WINDOW

(75) Inventor: Rathindra Nahar, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/208,058

(22) Filed: Dec. 9, 1998

(51) Int. Cl.⁷ .................................................. G06K 7/10
(52) U.S. Cl. .............................. 235/462.14; 235/462.43
(58) Field of Search ....................... 235/462.14, 462.32, 235/462.43, 459, 470, 383, 462.38, 462.4, 462.1; 177/25.15

(56) References Cited

U.S. PATENT DOCUMENTS

| | | | |
|---|---|---|---|
| 3,863,775 A | * 2/1975 | Toback | 414/771 |
| 4,093,865 A | * 6/1978 | Nickl | 235/470 X |
| 4,543,720 A | * 10/1985 | Grunikiewicz et al. | 30/277.4 |
| 4,713,532 A | * 12/1987 | Knowles | 235/470 X |
| 4,799,164 A | * 1/1989 | Hellekson et al. | 235/462.4 |
| 4,881,606 A | 11/1989 | Halfon et al. | 177/126 |
| 4,971,177 A | 11/1990 | Nojiri et al. | 186/61 |
| 4,991,692 A | 2/1991 | Nojiri et al. | 186/61 |
| 5,005,329 A | * 4/1991 | Schorr | 52/204 |
| 5,005,670 A | 4/1991 | Nojiri | 186/61 |
| 5,042,821 A | 8/1991 | Bontly | 277/12 |
| 5,065,842 A | 11/1991 | Nahar | 186/61 |
| 5,079,412 A | 1/1992 | Sugiyama | 235/383 |
| 5,139,100 A | * 8/1992 | Brauneis | 235/383 X |
| 5,149,949 A | * 9/1992 | Wike, Jr. | 235/462.38 |
| 5,152,355 A | * 10/1992 | Copus | 177/128 |
| 5,196,696 A | * 3/1993 | Lindacher | 235/462.4 X |
| 5,232,185 A | 8/1993 | Schorr et al. | 248/27.3 |
| 5,235,168 A | 8/1993 | Bobba | 235/462 |
| 5,352,002 A | 10/1994 | Vouillon et al. | 292/155 |
| 5,383,034 A | * 1/1995 | Imamura et al. | 358/474 |
| 5,400,510 A | * 3/1995 | Glodowski | 30/164.9 |
| 5,410,108 A | * 4/1995 | Williams et al. | 177/25.15 |
| 5,512,740 A | 4/1996 | Hone et al. | 235/472 |
| 5,531,293 A | 7/1996 | Nahar | 186/59 |
| 5,661,297 A | * 8/1997 | Aleshire et al. | 250/239 |
| 5,834,708 A | * 11/1998 | Svetal et al. | 235/462.14 X |
| 6,098,885 A | * 8/2000 | Knowles et al. | 235/462.4 |

* cited by examiner

Primary Examiner—Michael G. Lee
Assistant Examiner—Jared J. Fureman
(74) Attorney, Agent, or Firm—Francis L. Conte

(57) ABSTRACT

A barcode scanner window includes a frame having an aperture, and window pane disposed therein. The pane is smaller than the aperture and is bonded therein by an adhesive.

20 Claims, 5 Drawing Sheets

FLUSH SCANNER WINDOW

BACKGROUND OF THE INVENTION

The present invention relates generally to barcode scanners, and, more specifically, to windows thereof.

One type of barcode scanner is configured for being mounted flush to a counter in a retail establishment such as a grocery supermarket. The scanner includes a housing containing a laser and cooperating optical elements for projecting a pattern of scan lines outwardly therefrom for engaging a barcode on a merchandise item.

A window is disposed atop the scanner housing for transmitting the laser scan lines from the housing to the item, with light reflected from the barcode being returned through the window for decoding in the scanner. The window includes a typically flat frame with an aperture therethrough in which a transparent pane of glass is suitably mounted for transmitting both the scan lines and their reflected light.

In typical operation, the grocery items are dragged individually over the window in sliding contact therealong instead of being lifted thereover. Accordingly, the window pane is typically mounted below the top surface of the frame to prevent snagging of the grocery items which would slow the scanning process and possibly damage the window pane. However, recessing the pane can provide a step or lip around the aperture which can also snag grocery items, as well as provide a pocket in which debris may accumulate over time.

To eliminate these problems, the window pane may be mounted flush in its frame in various manners having different advantages and disadvantages including complexity and cost. For example, the window pane may be removably mounted by resting atop an upwardly facing pocket formed in the frame around the aperture. The pane must be suitably resiliently supported to prevent damage thereto which correspondingly decreases the ability for maintaining a substantially flush or smooth top surface with the frame to prevent snagging.

A difference in elevation between the top of the pane and the top of frame of as little as about a few mils can cause objectionable snagging and potential damage to the pane. It is difficult in practice to achieve a flush mount in view of the large tolerances in thickness typical in the manufacture of the glass pane, and in the depth of the pocket.

Improved accuracy of mounting the pane in its frame may be obtained by mounting the pane from below the frame in a corresponding downwardly facing pocket. This however increases the complexity of the pane itself since a top extension thereof is required to extend through the aperture to an elevation flush with the top surface of the frame. The pane extension may be provided by machining a step around the perimeter of the pane for providing an upwardly extending plateau disposed flush with the frame top surface. Or, a thin glass laminate may be bonded to the top of the pane for otherwise producing the required step.

In this way, the bottom of the stepped pane may be precisely fixedly mounted inside the frame with the top of the step being disposed flush with the top of the frame. Although the resulting flush mounted pane provides acceptable performance, the mounting thereof is relatively complex and expensive.

Accordingly, it is desired to provide an improved barcode scanner window having a flush mounted window pane therein in a simple and inexpensive construction.

BRIEF SUMMARY OF THE INVENTION

A barcode scanner window includes a frame having an aperture, and window pane disposed therein. The pane is smaller than the aperture and is bonded therein by an adhesive.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
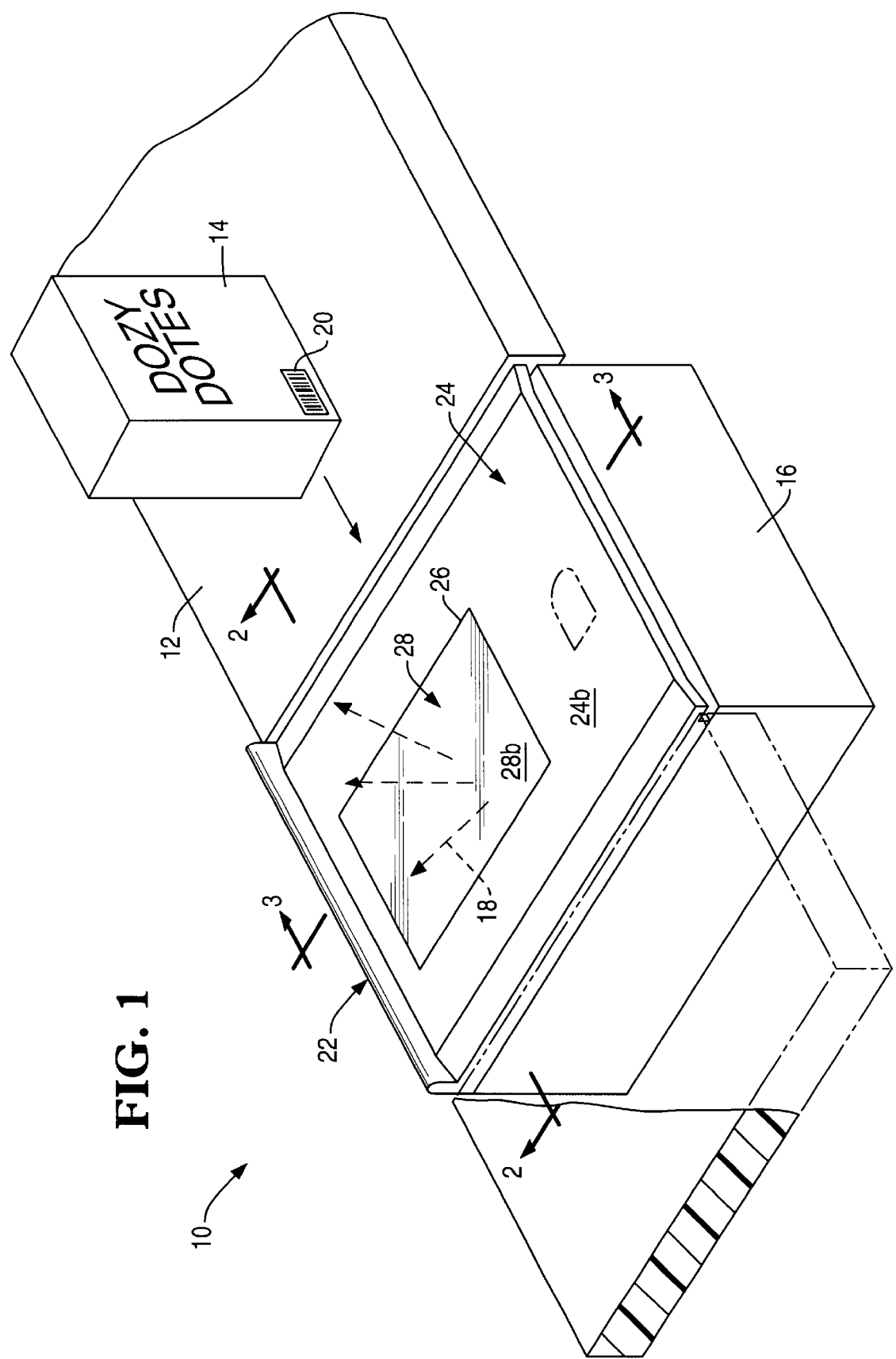
FIG. 1 is an isometric view of exemplary barcode scanner having a flush mounted window in accordance with an exemplary embodiment of the present invention cooperating with a counter over which merchandise items may be dragged for scanning.

Illustrated in FIG. 1 is a barcode scanner 10 mounted flush in a counter 12 over which may be dragged merchandise or grocery items 14. The scanner 10 includes a housing 16 configured in any conventional manner to include a laser and cooperating optical elements for producing laser scan lines 18 in a suitable pattern for being reflected off a conventional barcode 20 on the item 14 as it is dragged across the scanner. The barcode typically includes a series of alternating dark bars and light spaces of varying width which may be decoded by the scanner in any conventional manner.

The scanner 10 also includes a cover plate or window 22 in accordance with an exemplary embodiment of the present invention through which the scan lines 18 may be transmitted upwardly to engage the barcode 20, with light reflected therefrom being reflected back through the window inside the housing 16 through collection optics therein for decoding the barcode.

The window 22 is an assembly of parts including a window frame 24 having an externally exposed aperture 26 therethrough. A window pane 28 in the form of a simple flat plate of transparent glass is slightly smaller in size than the aperture and disposed therein. The window 22 is illustrated in section in FIG. 2 and also includes an adhesive 30 bridging the pane and frame along at least a portion of the aperture to bond the pane in a fixed mount to the frame.

Figure 2:
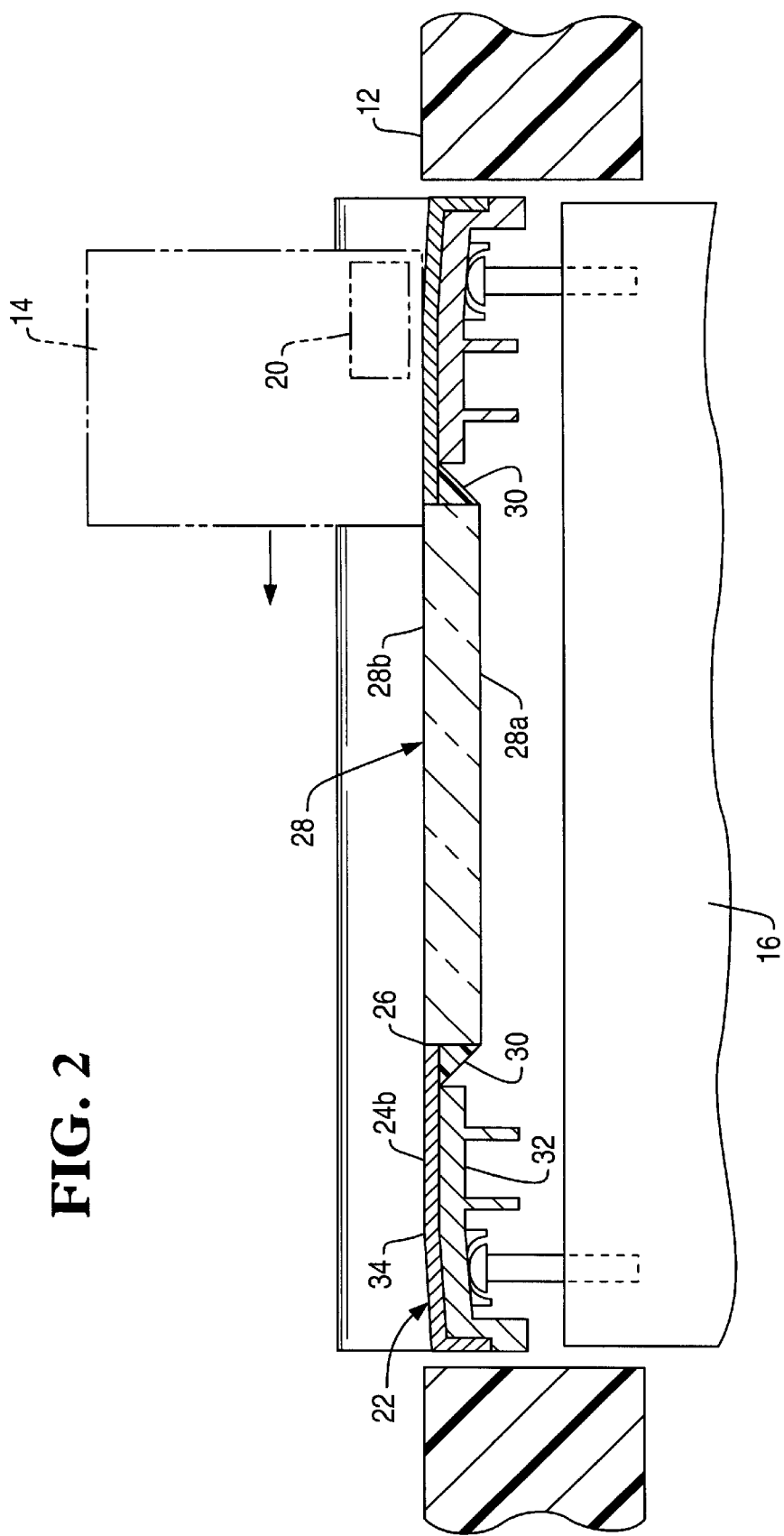
FIG. 2 is an elevational, sectional view through the scanner illustrated in FIG. 1 and taken generally along line 2—2.
Figure 3:
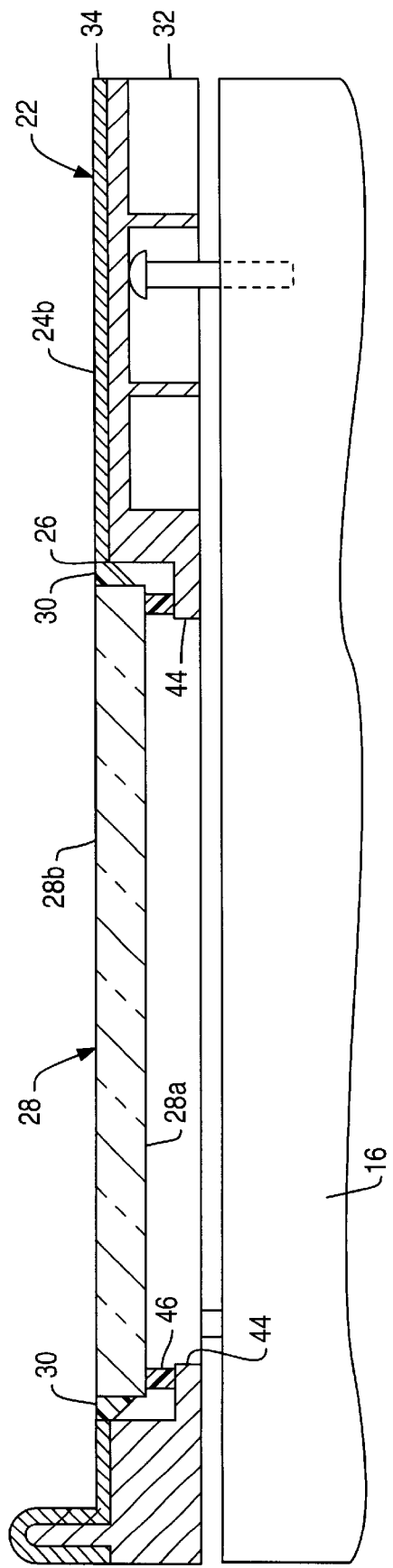
FIG. 3 is an elevational, sectional view through the barcode scanner illustrated in FIG. 1 and taken generally along line 3—3.

In the exemplary embodiment illustrated in FIGS. 2 and 3, the frame 24 itself may have any conventional construction. For example, the frame 24 includes an aluminum core 32 having a flat top surface and a ribbed lower surface for providing structural strength with low weight. A stainless steel sheet metal cover 34 is fixedly attached to the core using a suitable adhesive therebetween as well as having mechanical crimps around the perimeter thereof. The stainless steel cover is substantially flat and provides a durable surface over which the grocery items may be dragged.

In the exemplary embodiment illustrated in FIG. 1, the window 22 is generally coplanar with the top surface of the counter 12 and may have slightly tapered leading and trailing edges for providing a smooth transition between the counter and the window as the items are dragged thereacross. In an exemplary embodiment, the window 22 also defines a tray removably resting atop the housing 16, which is further configured as a weighing scale for weighing various items resting atop the window.

But for the specific mounting of the window pane 28 in the frame 24, the window 22 may have any conventional form or configuration. More specifically, and referring to FIG. 4, the window pane 28 is a simple, preferably rectangular monolithic block of glass having a rectangular perimeter 36 defined by four intersecting flat edges. The perimeter is complementary with the rectangular shape of the aperture 26 and is slightly smaller for fitting therein without interference.

Figure 5:
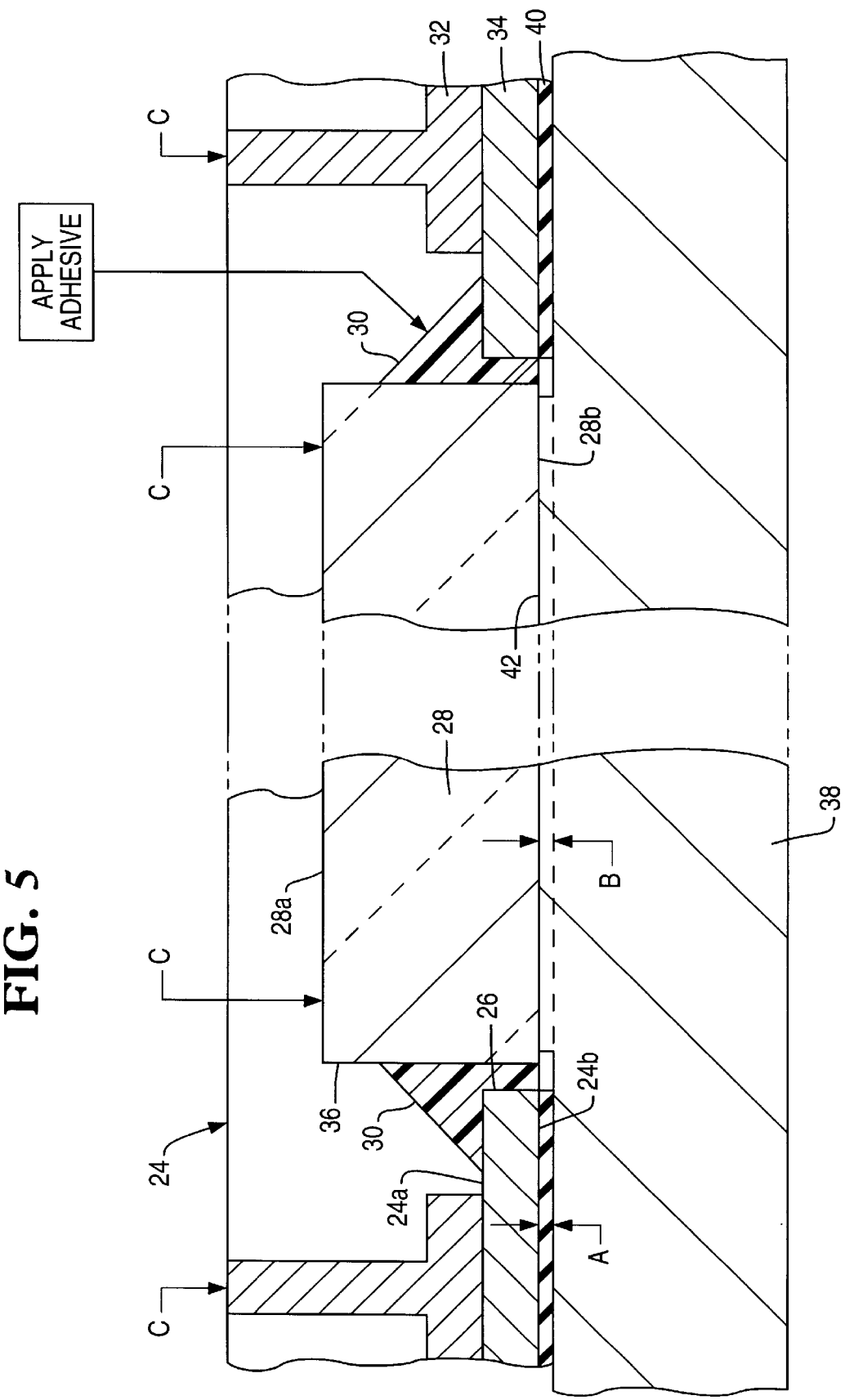
FIG. 5 is an enlarged, elevational sectional view through a portion of the scanner window illustrated in FIG. 4 during assembly atop the table and taken generally along line 5—5.

As shown in more detail in FIG. 5, the adhesive 30 is preferably bonded only to the perimeter 36 and a corresponding portion of the frame to fixedly mount the pane to the frame. The adhesive 30 may have any suitable composition, and in the preferred embodiment is a room temperature vulcanizing silicone such as that identified by the designation GE-5040 available from The General Electric Company of Waterford, N.Y. Silicone is preferred for its ability to fixedly bond the pane 28 to the frame with slight resiliency or flexibility, and for its ability to resist degradation due to liquid spills thereon such as acidic vinegar or citrus juices.

As shown in FIG. 5, the frame 24 also includes a bottom surface 24a defined by the inwardly facing, hidden inner surface of the cover 34 around the exposed aperture 26. The adhesive 30 bonds the pane 28 to the frame bottom surface and preferably also fills the perimeter gap around the pane 28 in the aperture 26. The adhesive 30 is preferably disposed continuously around the full perimeter 28 for providing a full perimeter support thereof as well as completely sealing the pane 28 in the frame aperture 26. The seal prevents liquid leakage inside the scanner housing for protecting the operative components thereof.

As shown in FIGS. 2 and 3, the frame 24 also includes a planar top surface 24b around the aperture 26, and the pane 28 correspondingly includes a planar top surface 28b aligned with the frame top surface in accordance with the present invention. The pane 28 also includes a bottom surface 28a which is hidden from view inside the frame.

As shown in FIGS. 1–3, the pane top surface 28b is preferably disposed substantially flush or level with the frame top surface 24b for effecting a smooth transition between. The pane top surface is preferably no higher than the frame top surface to prevent a step at the pane which would hinder the smooth travel of the grocery items as they are dragged across the window 22 during operation.

In order to drag the grocery items without hindrance, the window 28 is preferably completely smooth with no abrupt changes or steps therein at the window pane 28 to prevent catching a grocery item which may chip the edge of the pane leading to damage thereof. Since a conventional scanner window is an assembly of components, each component requires precision in its dimensions for ensuring proper alignment of the window pane and the frame top surfaces. As indicated above, this increases the complexity of the scanner window design and attendant cost in manufacture thereof.

Figure 4:
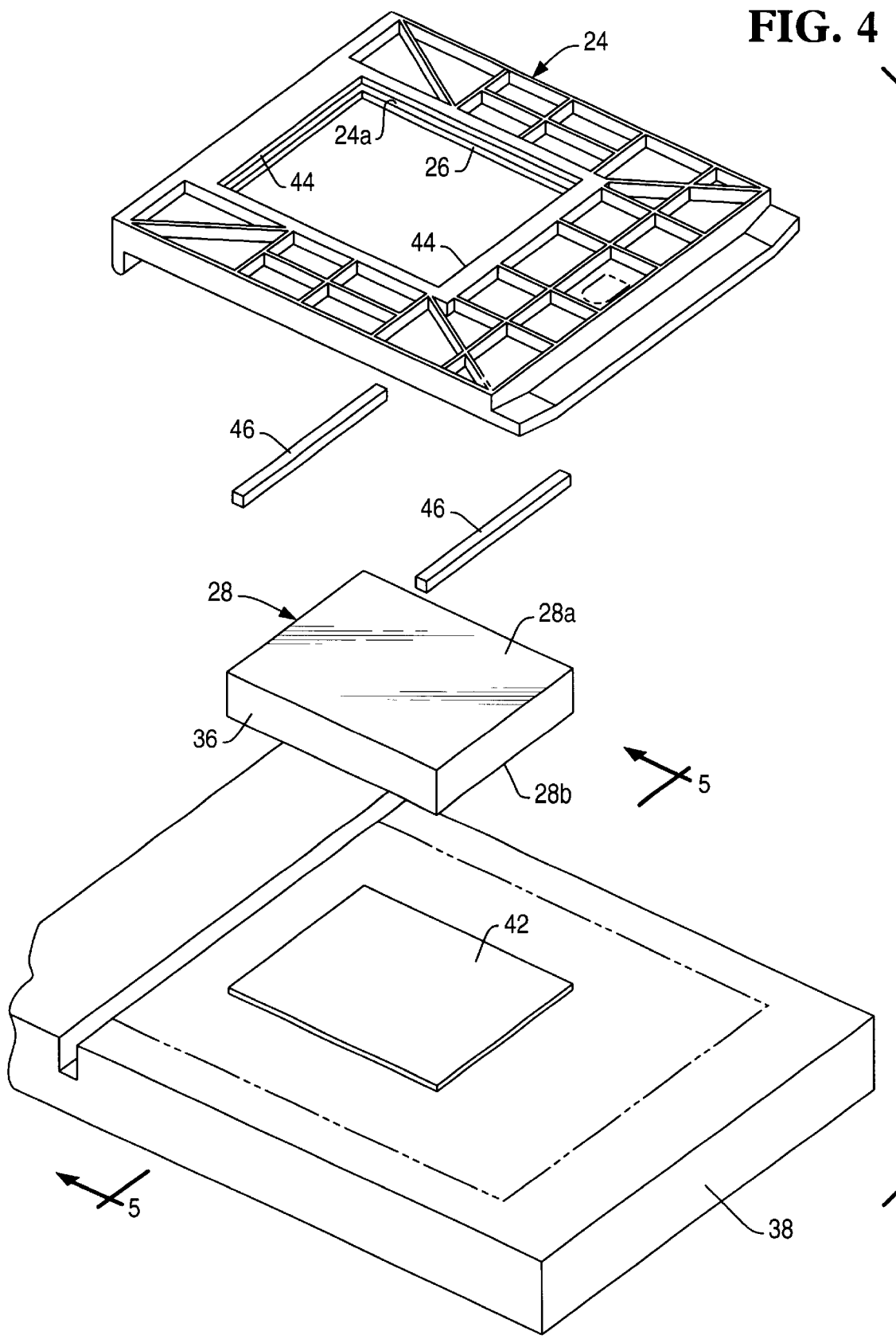
FIG. 4 is an exploded, inverted view of the scanner window illustrated in FIGS. 1–3 being assembled atop an assembly table in accordance with a preferred method of the present invention.

However, in accordance with another feature of the present invention, the scanner window 22 illustrated in FIG. 4 is a substantially simpler assembly of components including a monolithic pane of glass simply mounted within the frame aperture 26 in an improved manner. The components are accurately assembled by simply placing or resting the window pane 28 upsidedown or inverted atop a substantially flat assembly table 38. The frame 24 may then be rested in inverted orientation atop the table 38, with the pane being positioned inside the frame aperture 26. Since the pane is smaller than the aperture 26, it may be positioned therethrough without obstruction therefrom, thusly permitting the self-alignment of these components on the table.

As shown in FIG. 5, the adhesive 30 may then be applied between the pane 28 and the frame 24 along the edge of the aperture 26. The adhesive is then allowed to cure to fixedly bond the pane in the frame.

Since the pane and frame are assembled together upsidedown atop the flat table 38, the corresponding top surfaces of both the pane and frame are inverted in abutting contact with the top surface of the table 38 for self-alignment which provides a completely flush pane in the aperture.

As shown schematically in FIG. 5, a plurality of suitable clamps may be used for providing point clamp loads C distributed atop the inverted frame 24 and pane 28 to maintain these components in flat contact with the table 38 for maintaining alignment therebetween as the adhesive 30 cures. After adhesive curing, the clamps may be removed and the assembled window 22 may be removed from the table, with the pane 28 remaining substantially flush with the top surface of the frame.

The small gap between the aperture 26 and the perimeter of the pane 28 is filled with the adhesive 30 for not only providing a resilient mount in the frame, but for sealing the perimeter of the pane from leakage of any liquid which may accumulate atop the scanner window 22 during operation. Any such liquid will therefore not leak into the scanner housing but may be suitably wiped up or swept off the sides of the window.

As indicated above, the frame 24 is preferably formed of the structural core 32 and the stainless steel cover 34. In this embodiment, the cover 34, without the core 32, may be initially bonded to the pane 28 in the same assembly process described above to permit unobstructed access for applying the adhesive along the entire perimeter of the pane. And then, the core 32 may be attached to the pre-assembled cover and pane.

The cover 34 as illustrated in FIG. 5 is typically provided with a removable top liner 40 covering the top surface of the frame around the aperture. The liner 40 is typically a transparent vinyl applied during the manufacture of the stainless steel sheet metal for protecting its surface from abrasive damage during subsequent manufacturing steps prior to reaching the ultimate destination, at which time the liner may be simply peeled away.

A typical liner has a thickness A of about 4 mils which correspondingly elevates the inverted top surface 24b of the frame the same amount atop the assembly table 38 illustrated in FIG. 5. Since stamping out the aperture 26 during manufacture of the cover 34 also removes the liner portion therewith, the inverted assembly of the pane 28 through the aperture 26 will not be completely flush with the top surface of the cover, but instead with the top surface of the remaining liner.

Accordingly, a suitable shim having the thickness of the liner 40 is preferably disposed between the pane 28 and the assembly table 38 for accommodating the thickness of the liner 40 to ensure that the top surface of the pane 28 is completely flush with the top surface of the frame 24 at its cover 34. The pane 28 is therefore flush with the frame top surface 24b below the liner 40 thereon.

In the exemplary embodiment illustrated in FIG. 5, this may be effected by machining the top of the table 38 to produce an integral plateau 42 having an elevation B greater than the surrounding surface of the table which is preferably at least as large as the thickness A of the liner 40. The plateau 42 has a rectangular configuration complementary with the rectangular configuration of the pane 28 and aperture 26 for being disposed therein when the frame 24 is rested atop the assembly table 38. The plateau 42 extends upwardly into the aperture 26 for supporting the inverted pane top surface at an elevation corresponding to the thickness of the liner around the aperture. The adhesive 30 is then applied and allowed to cure.

Upon removal of the assembled frame 24 and pane 28, the top surface of the pane will be depressed below the surface of the liner 40 so that upon peeling away the liner 40 the pane and cover are completely flush around the aperture 26.

Since the frame 24 may not be perfectly flat, it may be desirable to size the plateau 42 to effect a suitably small down-step between the top surface of the pane relative to the frame. In this way, the pane can be at least flush in part around its perimeter with the frame, without obtaining an undesirable up-step.

Since the window 22 is preferably mounted horizontally atop the housing near the counter 12, the pane 28 may be subjected to substantial vertical loads due to the weight of the grocery items 14 dropped or placed thereatop, or in the event a clerk stands atop the window 22 for performing some maintenance function inadvertently using the scanner as a stepping stool. Since the pane 28 is simply mounted to the frame 24 by the adhesive 30, the adhesive has limited capability for withstanding such excessive loads placed atop the pane 28.

Accordingly, the window 22 preferably also includes a pair of supporting braces 44 as shown in FIGS. 3 and 4 fixedly joined to the frame below the perimeter of the pane. The braces 44 are preferably disposed in a single pair solely at opposite ends of the pane 28, with the pane being unbraced therebetween on its remaining two sides.

A suitable compressible gasket 46 is disposed in compression between the pane 28 and each of the braces in a butting contact therebetween. The spacing between the braces 44 and the pane bottom surface 28a may be selected for allowing limited downward travel of the pane 28 under load without damaging the flexible adhesive bond 30. As the gasket 46 is additionally compressed under external load atop the pane, loads from the pane 28 will be transferred to the underlying braces 44 and into the frame 24 to prevent liberation of the pane from its adhesive mount.

The braces 44 may be discrete members suitably secured to the frame by fasteners for example, or may be integrally formed in the frame core 32 in the exemplary embodiment illustrated in FIGS. 3 and 4.

As shown in FIG. 4, the braces 44 do not obstruct the inverted assembly of the frame 24 atop the pane 28 when assembled on the table 38, and provide sufficient clearance atop the inverted pane to permit the desired flush alignment between the pane and frame. The gaskets 46 may be compressed between the braces 44 and the pane 28 during the assembly process and remain compressed by the clamps as the adhesive 30 cures. Or, the gaskets 46 may be subsequently inserted between the braces 44 and the pane 28 after assembly thereof and curing of the adhesive 30.

The resulting window frame is therefore a relatively simple assembly of the monolithic pane 28 in its complementary frame aperture 26 bonded therein by the adhesive 30, with a substantially flush top surface therebetween. Steps between the pane and the frame may therefore be completely eliminated in a simple assembly, and in a simple assembly process. Flush alignment of the pane is maintained by the adhesive only, and does not change over the useful life of the adhesive.

However, steps may be introduced between the pane and frame as desired. For example, a predetermined down-step of the pane may be used to prevent an up-step due to manufacturing tolerance variations between the pane and frame. Or, the pane may be slightly inclined, with a leading edge down-step with the frame, and a trailing edge up-step. In this way, grocery items may be dragged over the pane without snagging against the leading edge thereof.

In the event that a pane 28 becomes damaged over its life, it may be simply removed by cutting and removing the adhesive 30, and a replacement pane 28 may be installed in the same manner described above.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A barcode scanner window comprising:

a frame having a top surface for sliding thereacross a barcoded item, and further having an aperture disposed through said top surface;

a window pane being smaller than said aperture and extending therethrough to said top surface; and an adhesive bridging said pane and frame along said aperture to bond said smaller pane to said frame inside said larger aperture.

2. A window according to claim 1 wherein said pane includes a perimeter being complementary with said aperture, and said adhesive is bonded to said perimeter to fixedly mount said pane to said frame.

3. A window according to claim 2 wherein said frame further includes a bottom surface around said aperture, and said adhesive bonds said pane thereto.

4. A window according to claim 3 wherein said adhesive is disposed continuously around a full perimeter of said pane.

5. A window according to claim 3 wherein:

said frame top surface is planar around said aperture; and said pane further includes a planar top surface aligned with said frame top surface.

6. A window according to claim 5 wherein said pane top surface is substantially flush with said frame top surface.

7. A window according to claim 5 wherein said pane top surface is no higher than said frame top surface.

8. A window according to claim 5 wherein said adhesive is flexible, and further comprising:

a brace fixedly joined to said frame below said pane perimeter; and a gasket disposed between said pane and said brace.

9. A window according to claim 8 further comprising a pair of said braces and cooperating gaskets disposed solely at opposite ends of said pane, and said pane is unbraced therebetween.

10. A window according to claim 5 further comprising:
a removable top liner covering said frame top surface around said aperture; and
said pane is flush with said frame top surface below said liner thereon.

11. A method of assembling said window according to claim 1 comprising:
resting said pane inverted atop an assembly table;
resting said frame inverted atop said table and atop said inverted pane, with said pane positioned inside said frame aperture;
applying said adhesive between said pane and frame along said aperture; and
curing said adhesive to fixedly bond said pane in said frame.

12. A method according to claim 11 wherein said pane includes a top surface inverted with said frame top surface in abutting contact with a top surface of said table for self-alignment.

13. A method according to claim 12 wherein said frame further includes a removable top liner covering said top surface thereof around said aperture, and said table includes a plateau supporting said inverted pane top surface at an elevation corresponding to a thickness of said liner around said aperture.

14. A removable window for a barcode scanner comprising a window pane adhesively bonded in a complementary and larger aperture disposed through a top surface of a frame to provide a substantially coplanar top surface with said frame top surface for sliding without snagging barcoded items being read by said scanner through said window pane.

15. A window according to claim 14 wherein said pane includes a perimeter adhesively bonded to said aperture to provide a full-perimeter seal therearound.

16. A window according to claim 15 further comprising a brace fixedly joined to said frame below said pane perimeter for additionally supporting said pane thereto.

17. A window according to claim 16 further comprising a gasket disposed between said pane and said brace.

18. A window according to claim 15 wherein said frame includes a structural core and a stainless steel cover, and said window pane is adhesively bonded to said cover substantially flush therewith.

19. A window according to claim 15 wherein said scanner is configured to be mounted flush in a counter, and said window frame includes leading and trailing edges generally coplanar with said pane, and configured to be mounted generally coplanar with said counter.

20. A window according to claim 19 wherein said leading and trailing edges are tapered from opposite ends of said frame.

\* \* \* \* \*